US012371012B2

(12) United States Patent
Paris et al.

(10) Patent No.: US 12,371,012 B2
(45) Date of Patent: Jul. 29, 2025

(54) METHOD FOR INFLUENCING ENTITIES AT A ROADWAY INTERSECTION

(71) Applicant: Direct Current Capital LLC, Wilmington, DE (US)

(72) Inventors: Michael Paris, Mountain View, CA (US); Carol Reiley, Mountain View, CA (US)

(*) Notice: Subject to any disclaimer, the term of this patent is extended or adjusted under 35 U.S.C. 154(b) by 0 days.

(21) Appl. No.: 18/385,324

(22) Filed: Oct. 30, 2023

(65) Prior Publication Data

US 2024/0059283 A1 Feb. 22, 2024

Related U.S. Application Data

(63) Continuation of application No. 17/146,320, filed on Jan. 11, 2021, now Pat. No. 11,801,833, which is a
(Continued)

(51) Int. Cl.
*B60W 30/095* (2012.01)
*B60Q 5/00* (2006.01)
(Continued)

(52) U.S. Cl.
CPC ......... *B60W 30/0956* (2013.01); *B60Q 5/006* (2013.01); *B60W 30/06* (2013.01);
(Continued)

(58) Field of Classification Search
CPC .. B60W 30/0956; B60W 30/06; B60W 30/09; B60W 30/143; B60W 30/18154;
(Continued)

(56) References Cited

U.S. PATENT DOCUMENTS 2,190,123 A 2/1940 Pace
7,095,318 B1 8/2006 Bekhor
(Continued)

FOREIGN PATENT DOCUMENTS

EP 1912157 4/2008

OTHER PUBLICATIONS

"Nissan IDS Concept: Nissan's vision for the future of EVs and autonomous driving," Oct. 27, 2015, http://nissannews.com/en-US/nissan/USA/releases/nissan-ids-concept-nissan-s-vision-for-the-future-of-evs-and-autonomous-driving, accessed Sep. 14, 2016.
(Continued)

*Primary Examiner* — Tyler D Paige
(74) *Attorney, Agent, or Firm* — Polsinelli, PC

(57) ABSTRACT

One variation of a method for influencing entities proximal a road surface includes, at an autonomous vehicle: over a first period of time, detecting a pedestrian proximal a road surface; predicting an initial path of the pedestrian an initial confidence score for the initial path of the pedestrian based on and motion of the pedestrian during the first period of time; in response to the initial confidence score falling below a threshold confidence, replaying an audio track audible to the pedestrian and calculating a revised path of the pedestrian and a revised confidence score for the revised path based on motion of the pedestrian following replay of the audio track; and autonomously navigating across the road surface according to a planned route in response to the revised path of the pedestrian falling outside of the planned route and the revised confidence score exceeding the threshold confidence.

20 Claims, 3 Drawing Sheets

Related U.S. Application Data continuation of application No. 16/228,617, filed on Dec. 20, 2018, now Pat. No. 10,889,295, which is a continuation of application No. 15/814,207, filed on Nov. 15, 2017, now Pat. No. 10,196,058.

(60) Provisional application No. 62/427,111, filed on Nov. 28, 2016.

(51) Int. Cl.
*B60W 30/06* (2006.01)
*B60W 30/09* (2012.01)
*B60W 30/14* (2006.01)
*B60W 30/18* (2012.01)
*B60W 40/02* (2006.01)
*B60W 50/00* (2006.01)
*G05D 1/00* (2006.01)
*G08G 1/16* (2006.01)

(52) U.S. Cl.
CPC .......... *B60W 30/09* (2013.01); *B60W 30/143* (2013.01); *B60W 30/18154* (2013.01); *B60W 40/02* (2013.01); *B60W 50/0097* (2013.01); *G05D 1/0088* (2013.01); *G05D 1/0214* (2013.01); *G08G 1/166* (2013.01); *B60W 2554/00* (2020.02)

(58) Field of Classification Search
CPC ............ B60W 40/02; B60W 50/0097; B60W 2554/00; B60Q 5/006; G05D 1/0088; G05D 1/0214; G08G 1/166
USPC ........................................................ 701/27
See application file for complete search history.

(56) References Cited

U.S. PATENT DOCUMENTS

| | | | |
|---|---|---|---|
| 7,844,394 B2 | 11/2010 | Kim | |
| 7,647,180 B2 | 12/2010 | Breed | |
| 7,924,146 B2 | 4/2011 | Seder et al. | |
| 8,269,652 B2 | 9/2012 | Seder et al. | |
| 8,514,100 B2 | 8/2013 | Yamashita | |
| 8,849,494 B1 | 9/2014 | Herbach | |
| 8,996,224 B1 | 3/2015 | Herbach | |
| 9,196,164 B1 | 11/2015 | Urmson et al. | |
| 9,336,436 B1 | 5/2016 | Dowdall | |
| 9,428,186 B2 | 8/2016 | Breed | |
| 9,535,423 B1 | 1/2017 | Debreczeni | |
| 9,654,738 B1 | 5/2017 | Ferguson | |
| 9,718,405 B1 | 8/2017 | Englander et al. | |
| 9,829,889 B1 | 11/2017 | Kusano et al. | |
| 9,849,784 B1 | 12/2017 | Chan | |
| 9,870,703 B2 | 1/2018 | MacNeille et al. | |
| 9,881,503 B1 | 1/2018 | Goldman-Shenhar et al. | |
| 9,884,585 B1 | 2/2018 | Lubbers | |
| 9,902,311 B2 | 2/2018 | Sweeney | |
| 9,954,252 B2 | 4/2018 | Ogihara et al. | |
| 9,994,148 B1 | 6/2018 | Kim | |
| 10,053,001 B1 | 8/2018 | Nabbe et al. | |
| 10,118,548 B1* | 11/2018 | Fields | G08G 1/005 |
| 10,196,058 B2* | 2/2019 | Paris | B60Q 5/006 |
| 10,261,513 B2 | 4/2019 | Reiley et al. | |
| 10,262,528 B2 | 4/2019 | Fields et al. | |
| 10,317,907 B2 | 6/2019 | Shami | |
| 10,889,295 B2* | 1/2021 | Paris | B60W 50/0097 |
| 11,079,765 B2 | 8/2021 | Reiley et al. | |
| 11,801,833 B2* | 10/2023 | Paris | B60W 30/0956 |
| 2003/0023370 A1 | 1/2003 | Millington et al. | |
| 2003/0147247 A1 | 8/2003 | Koike | |
| 2004/0193347 A1 | 9/2004 | Harumoto | |
| 2005/0117364 A1 | 6/2005 | Rennick et al. | |
| 2007/0277100 A1 | 11/2007 | Sheha et al. | |
| 2008/0161986 A1 | 7/2008 | Breed | |
| 2009/0069977 A1 | 3/2009 | Markyvech | |
| 2010/0082251 A1 | 4/2010 | Kogure | |
| 2010/0328055 A1 | 12/2010 | Fong et al. | |
| 2011/0046835 A1 | 2/2011 | Taguchi | |
| 2011/0090093 A1 | 4/2011 | Grimm et al. | |
| 2011/0184617 A1 | 7/2011 | Hegemann et al. | |
| 2011/0199199 A1 | 8/2011 | Perkins | |
| 2011/0234422 A1 | 9/2011 | Yamashita | |
| 2012/0083960 A1 | 4/2012 | Zhu et al. | |
| 2012/0179280 A1 | 7/2012 | Faye | |
| 2012/0242479 A1 | 9/2012 | Ghazarian et al. | |
| 2012/0310465 A1 | 12/2012 | Boatright | |
| 2013/0265791 A1 | 10/2013 | Dassanayake et al. | |
| 2013/0345900 A1 | 12/2013 | Usui | |
| 2014/0180914 A1 | 6/2014 | Abhyanker | |
| 2014/0268353 A1 | 9/2014 | Fujimura et al. | |
| 2014/0324266 A1 | 10/2014 | Zhu et al. | |
| 2014/0333468 A1 | 11/2014 | Zhu et al. | |
| 2014/0365126 A1 | 12/2014 | Vulcano et al. | |
| 2015/0066284 A1 | 3/2015 | Yopp | |
| 2015/0151725 A1 | 6/2015 | Clarke et al. | |
| 2015/0183430 A1 | 7/2015 | Schwindt et al. | |
| 2015/0202770 A1 | 7/2015 | Patron et al. | |
| 2015/0332114 A1 | 11/2015 | Springer | |
| 2015/0336502 A1* | 11/2015 | Hillis | G05D 1/0088 |
| | | | 701/23 |
| 2016/0003636 A1 | 1/2016 | Ng-Thow-Hing | |
| 2016/0012813 A1 | 1/2016 | Every et al. | |
| 2016/0040997 A1 | 2/2016 | Otani | |
| 2016/0061613 A1 | 3/2016 | Jung et al. | |
| 2016/0068099 A1 | 3/2016 | Peterson et al. | |
| 2016/0207443 A1 | 7/2016 | Widdowson et al. | |
| 2016/0231746 A1 | 8/2016 | Hazelton et al. | |
| 2016/0355179 A1 | 12/2016 | Cannella et al. | |
| 2016/0355192 A1 | 12/2016 | James | |
| 2016/0375900 A1 | 12/2016 | Laur et al. | |
| 2017/0193384 A1 | 7/2017 | Mudalige et al. | |
| 2017/0217368 A1 | 8/2017 | Lewis | |
| 2017/0240096 A1 | 8/2017 | Ross | |
| 2017/0240098 A1 | 8/2017 | Sweeney et al. | |
| 2017/0243490 A1 | 8/2017 | Leppanen et al. | |
| 2017/0270374 A1 | 9/2017 | Myers et al. | |
| 2017/0277192 A1 | 9/2017 | Gupta et al. | |
| 2018/0072218 A1 | 3/2018 | Sweeney | |
| 2018/0075309 A1 | 3/2018 | Sathyanarayana et al. | |
| 2018/0276986 A1 | 9/2018 | Delp | |
| 2018/0286232 A1 | 10/2018 | Shau | |
| 2018/0329418 A1* | 11/2018 | Baalke | G16Z 99/00 |
| 2019/0196482 A1 | 6/2019 | Reiley et al. | |
| 2020/0005645 A1 | 1/2020 | Wray et al. | |
| 2020/0184278 A1 | 6/2020 | Zadeh et al. | |

OTHER PUBLICATIONS

Trivedi et al., Holistic Sensing and Active Displays for Intelligent Diver Support Systems, 2007, IEEE, p. 60-68.

Ng-Thow-Hing et al., User-centered perspectives for automotive augmented realtiy, 2013, IEEE, p. 13-22.

Mueller et al., "Object-related-navigation for mobile robots," 2012, IEEE, p. 603-610.

Wang et al., "Steering behaviors for autonomous vehicles in virtual environments," 2005, IEEE, p. 155-162.

Willemesen et al., "Ribbon networks for modeling navigable paths of autonomous agents in virtual environments," 2006, IEEE, p. 331-342.

Sotelo et al., "Vision-based navigation system for autonomous urban transport vehicles in outdoor environments," 2002, IEEE, p. 52-57.

Waxman et al., "A visual navigation system for autonomous land vehicles," 1987, IEEE, p. 124-141.

* cited by examiner

METHOD FOR INFLUENCING ENTITIES AT A ROADWAY INTERSECTION

CROSS-REFERENCE TO RELATED APPLICATIONS

This Application is a continuation of U.S. patent application Ser. No. 17/146,320, filed on Jan. 11, 2021, entitled "METHOD FOR INFLUENCING ENTITIES AT A ROADWAY INTERSECTION," which is a continuation of U.S. patent application Ser. No. 16/228,617, filed on Dec. 20, 2018, now U.S. Pat. No. 10,889,295, entitled "METHOD FOR INFLUENCING ENTITIES AT A ROADWAY INTERSECTION," which is a continuation of U.S. patent application Ser. No. 15/814,207, filed on Nov. 15, 2017, now U.S. Pat. No. 10,196,058, entitled "METHOD FOR INFLUENCING ENTITIES AT A ROADWAY INTERSECTION," which claims the benefit of U.S. Provisional Application Ser. No. 62/427,111, filed on Nov. 28, 2016, entitled "METHOD FOR INFLUENCING ENTITIES AT A ROADWAY INTERSECTION." Each of these applications is incorporated by reference in its entirety herein.

TECHNICAL FIELD

This invention relates generally to the field of autonomous vehicles and more specifically to a new and useful method for influencing entities at a roadway intersection in the field of autonomous vehicles.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
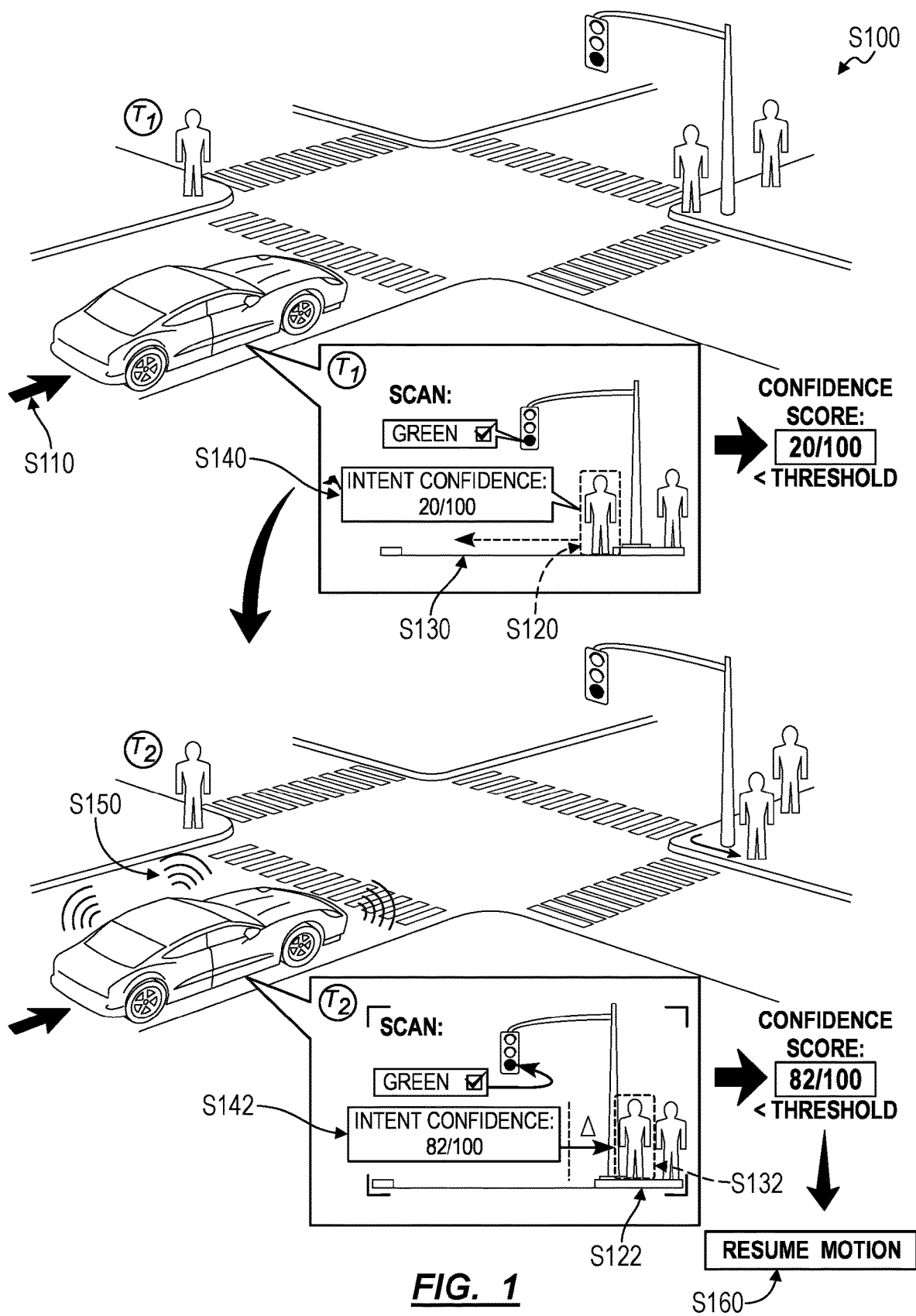
FIG. 1 is a flowchart representation of a method.
Figure 2:
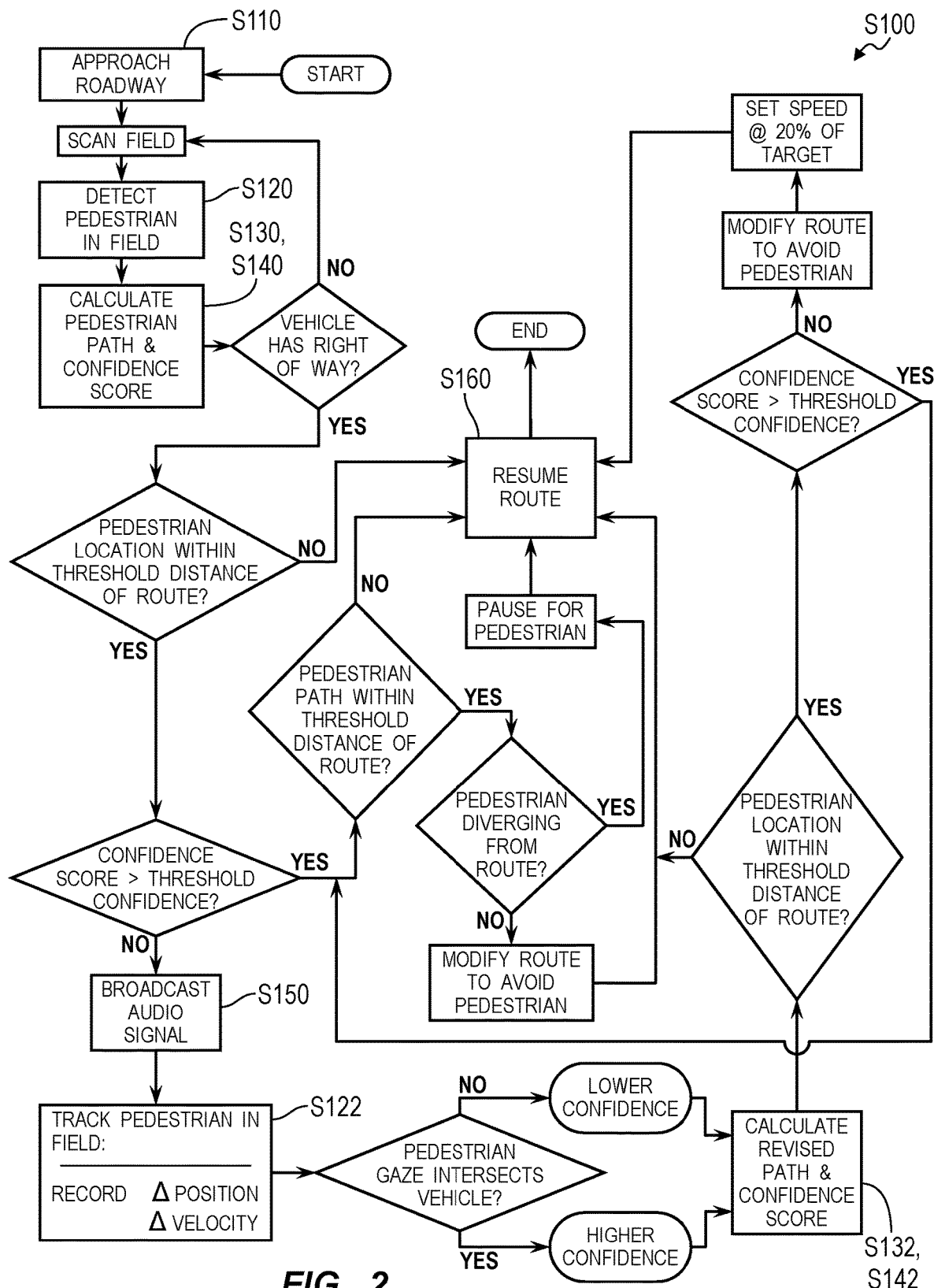
FIG. 2 is a flowchart representation of one variation of the method.

As shown in FIGS. 1 and 2, a method S100 for influencing entities at a roadway intersection includes, at an autonomous vehicle: approaching the road surface in Block Silo; over a first period of time, detecting a pedestrian proximal the road surface in Block S120; predicting an initial path of the pedestrian based on actions of the pedestrian during the first period of time in Block S130; and calculating an initial confidence score for the initial path of the pedestrian based on motion characteristics of the pedestrian during the first period of time in Block S140. The method S100 also includes, in response to the initial confidence score for the initial path of the pedestrian falling below a threshold confidence: replaying an audio track audible to the pedestrian in Block S150; tracking the pedestrian following replay of the audio track in Block S122; calculating a revised path of the pedestrian based on actions of the pedestrian following replay of the audio track in Block S132; and calculating a revised confidence score for the revised path of the pedestrian based on motion characteristics of the pedestrian following replay of the audio track in Block S142. The method S100 further includes, in response to the revised path of the pedestrian falling outside of a planned route of the autonomous vehicle across the road surface and in response to the revised confidence score exceeding the threshold confidence, autonomously navigating across the road surface according to the planned route in Block S160.

As shown in FIG. 1, one variation of the method S100 includes: approaching the road surface in Block S110; over a first period of time, detecting a pedestrian proximal the road surface in Block S120; predicting an initial intent of the pedestrian based on actions of the pedestrian during the first period of time in Block S130; and calculating an initial confidence score for the initial intent of the pedestrian based on motion characteristics of the pedestrian during the first period of time in Block S140. This variation of the method S100 also includes, in response to the initial confidence score for the initial intent of the pedestrian falling below a threshold confidence: replaying an audio track audible to the pedestrian in Block S150; tracking the pedestrian following replay of the audio track in Block S122; calculating a revised intent of the pedestrian based on actions of the pedestrian following replay of the audio track in Block S132; and calculating a revised confidence score for the revised intent of the pedestrian based on motion characteristics of the pedestrian following replay of the audio track in Block S142. Furthermore, this variation of the method S100 includes, in response to a location of the pedestrian falling outside of a threshold distance of a planned route of the autonomous vehicle and in response to the revised confidence score exceeding the threshold confidence, autonomously navigating across the road surface according to the planned route in Block S160.

2. Applications

The method S100 can be executed by an autonomous road vehicle (hereinafter "autonomous vehicle") to influence an action by a pedestrian nearby when the pedestrian's presence is affecting the autonomous vehicle's ability to reliably cross a road surface, such as navigate through an intersection, through a parking lot, or out of a parking space. Generally, the autonomous vehicle can execute Blocks of the method S100: to detect a pedestrian near the autonomous vehicle in Block S120; to characterize the pedestrian's intent to step into or out of the nearby road surface along the autonomous vehicle's route in Block S130; to quantify a confidence in the accuracy of the perceived intent of the pedestrian in Block S150; and to prompt an action by the pedestrian—such as at to enter a crosswalk, cross the road surface, or step back from the road surface near the planned route of the autonomous vehicle—by replaying an audio track in Block S150 when confidence in the perceived intent of the pedestrian falls below a threshold.

In particular, rather than summarily trigger a horn when a pedestrian is in the path of the autonomous vehicle, the autonomous vehicle can broadcast an audio signal when the intent of the pedestrian—near the route of the autonomous vehicle—is sufficiently indiscernible. Upon hearing this audio signal, the pedestrian may inherently alter her motion; by tracking the pedestrian's motion following broadcast of this audio signal, the autonomous vehicle can determine an intent of the pedestrian with greater confidence and then execute an action with greater confidence that this action will not result in a collision between the pedestrian and the autonomous vehicle given this refined comprehension of the pedestrian's intent.

In one example, upon reaching an intersection in Block S110, the autonomous vehicle can scan its environment for objects in and around the intersection and detect a pedestrian occupying an edge of a sidewalk or an edge of a crosswalk in Block S120. Due to the pedestrian's proximity to the roadway ahead of the autonomous vehicle and some motion (e.g., pacing, swaying) by the pedestrian, the autonomous vehicle can predict that the pedestrian intends to cross the roadway ahead of the autonomous vehicle in Block S130, but the autonomous vehicle can also calculate a low confidence score for the pedestrian's intent to cross the roadway in Block S140 given lack of direct motion by the pedestrian in the direction of the opposing sidewalk.

If the autonomous vehicle determines that it possesses (or is about to possess) right of way to cross this section of roadway near the pedestrian but the confidence score for the pedestrian's intent remains minimal (e.g., below a preset threshold confidence), the autonomous vehicle can replay an audio track—such as the sound of a revving engine and/or screeching tires even while the autonomous vehicle is stationary or moving at a relatively low speed—through various speakers integrated into the autonomous vehicle in Block S150. Upon hearing such sounds, the pedestrian may instinctively back away from the roadway ahead of the autonomous vehicle or increase her pace across the intersection to an opposite sidewalk; the autonomous vehicle can track the pedestrian's motion, revise the predicted intent of the pedestrian according to the pedestrian's post-prompt motion, and calculate an increased confidence score for the revised intent of the pedestrian given stronger direct motion of the pedestrian. In particular, if the autonomous vehicle determines that the pedestrian has backed away from the edge of the sidewalk in Block S122, the autonomous vehicle can determine with greater confidence that the pedestrian does not intend to cross the roadway in Blocks S132 and S142, and the autonomous vehicle can resume its planned route accordingly in Block S160. Similarly, if the autonomous vehicle determines that the pedestrian has increased her pace across the roadway in Block S122, the autonomous vehicle can determine with greater confidence that the pedestrian does intend to cross the roadway in Blocks S132 and S142, and the autonomous vehicle can wait for the pedestrian to cross the roadway before resuming its planned route in Block S160. However, if the autonomous vehicle determines that the pedestrian has not substantively changed her motion following replay of the audio signal in Block S122, the autonomous vehicle can determine—with greater confidence—that the pedestrian does not intend to move from her current location in Blocks S132 and S142, and the autonomous vehicle can resume its planned route accordingly in Block S160, such as by navigating along the roadway toward the pedestrian slowly and at a reduced acceleration rate.

The autonomous vehicle can therefore execute Blocks of the method S100 in order to avoid instances in the which autonomous vehicle becomes "stuck" within a scene for which the autonomous vehicle is not immediately confident that it will avoid collision with a pedestrian in the autonomous vehicle's planned route or merely near the autonomous vehicle's planned route. In particular, rather than merely wait for a pedestrian to move out of the autonomous vehicle's planned route and rather than merely sound a horn when a pedestrian is in the way of autonomous vehicle, the autonomous vehicle can execute Blocks of the method S100 to: characterize a pedestrian by confidence in a predicted future location of the pedestrian based on the pedestrian's recent motion; and to actively trigger the pedestrian to better communicate her intent (e.g., through machine-interpretable body language) by broadcasting an audio signal that may cause the pedestrian to instinctively modify her motion. The autonomous vehicle can thus actively manipulate a scene near the vehicle and prompt a change in the state or action of a pedestrian by selectively broadcasting audio signals. By continuing to track this pedestrian post-audio prompt and refining a perceived intent and corresponding confidence score for the pedestrian, the autonomous vehicle can more rapidly converge on a decision for approaching the pedestrian and execute this decision with reduced risk of collision between the autonomous vehicle and the pedestrian. (Alternatively, the autonomous vehicle can: implement similar methods and techniques to detect instances in which its navigation is inhibited by a pedestrian nearby; transmit a query to a remote human operator to assist the autonomous vehicle in navigating through its local scene when its navigation is inhibited by such a pedestrian; and then output an audible cue and/or execute a navigational action based on a command received from the remote operator.)

The method S100 is described herein as executed by an autonomous vehicle to influence motion of a pedestrian in or near a planned route of the autonomous vehicle, such as at an intersection or in a parking lot. However, the autonomous vehicle can implement similar methods and techniques to influence a bicyclist, a pedestrian on a scooter, a pedestrian in a wheelchair, a motorcyclist, and/or a driver of another road vehicle, etc. at or near a planned route of the autonomous vehicle.

3. Autonomous Vehicle

The autonomous vehicle can include: a suite of sensors configured to collect information about the autonomous vehicle's environment; one or more visual displays configured to render visual content related to the state of the autonomous vehicle, an intent of the autonomous vehicle, and/or a state of a road or intersection occupied by the autonomous vehicle to humans (e.g., pedestrians, drivers) outside of the vehicle and/or to other autonomous vehicles nearby; an audio driver (e.g., a speaker) configured to output audible sounds to influence humans nearby; and a controller configured to elect a future action or to make a navigational decision based on sensor streams output by the suite of sensors, to control the visual display(s) and/or the audio driver, and to navigate the autonomous vehicle accordingly over time.

In one implementation, the autonomous vehicle includes one or more 360° LIDAR sensors arranged on the top of the autonomous vehicle, such as at each of the front and rear of the autonomous vehicle. Each LIDAR sensor can output one three-dimensional distance map—such as in the form of a 3D point cloud representing distances between one meter and 50 meters between the LIDAR sensor and external surface within the field of view of the LIDAR sensor—per rotation of the LIDAR sensor (i.e., once per scan cycle). The autonomous vehicle can additionally or alternatively include: a set of infrared emitters configured to project structured light into a field near the autonomous vehicle; a set of infrared detectors (e.g., infrared cameras); and a processor configured to transform images output by the infrared detector(s) into a depth map of the field. The autonomous vehicle can also include one or more color cameras facing outwardly from the front, rear, and left lateral and right lateral sides of the autonomous vehicle. For example, each camera can output a video feed containing a sequence of digital photographic images (or "frames"), such as at a rate of 20 Hz. Furthermore, the autonomous vehicle can include a set of infrared proximity sensors arranged along the perimeter of the base of the autonomous vehicle and configured to output signals corresponding to proximity of objects and pedestrians within one meter of the autonomous vehicle. The controller within the autonomous vehicle can thus fuse data streams from the LIDAR sensor(s), the color camera(s), and the proximity sensor(s) into one real-time scan image of surfaces (e.g., surfaces of roads, sidewalks, road vehicles, pedestrians, etc.) around the autonomous vehicle per scan cycle, as shown in FIG. 1. Alternatively, the autonomous vehicle can stitch digital photographic images—output by multiple color cameras arranged throughout the autonomous vehicle—into a scan data or 3D point cloud of a scene around the autonomous vehicle.

The autonomous vehicle can then process scan data (e.g., a scan data and/or a set of 2D images collected during a scan period) into a state of a road surface nearby, identify other vehicles and/or pedestrians in the scan data, and fuse perception of the scene around the autonomous vehicle with a planned route to elect a future action or other navigational decision. For example, the autonomous vehicle can implement facial detection or object detection techniques to detect pedestrians and other mutable objects in the vicinity of the autonomous vehicle, such as with preference to pedestrians, etc. in the path of the autonomous vehicle ahead. The autonomous vehicle is described below as extracting features from scan data and selectively serving audible content to a pedestrian nearby in order to prompt a change in the pedestrian's motion based on these features. However, the autonomous vehicle can implement any other method or technique to detect a pedestrian, to characterize the pedestrian's path or intent, and to calculate a confidence score for the pedestrian's intent or path based on features extracted from any other one or more individual or composite data streams output by sensors integrated into the autonomous vehicle.

Therefore, in Block S110, the autonomous vehicle, can: scan a scene around the autonomous vehicle to determine its location and orientation in space (e.g., relative to features indicated in a localization map); to determine its location along a planned route; and to manipulate actuators within the autonomous vehicle to autonomously navigate along the planned route.

The method S100 is described herein as executed by a ground-based passenger, commercial, or fleet vehicle. However, Blocks of the method S100 can be executed by a wheeled vehicle of any other type.

4. Audio Drivers

The autonomous vehicle can also include one or more audio drivers (or "speakers") configured to output audio content in Block S150. For example, the autonomous vehicle can include: a front exterior speaker mounted behind its front grill; a left exterior speaker mounted on or near its left side-view mirror; a right exterior speaker mounted on or near its right side-view mirror; an upper-center exterior speaker mounted on its roof; and a rear exterior speaker mounted on or near its rear decklid. In this example, each of the front, left, right, upper center, and rear exterior speakers can include a directional speaker configured to output an audio signal in a primary direction. The autonomous vehicle can thus sweep an audio track across two or more such speakers in Block S150 to form a three-dimensional, structured, and dynamic audio signal audible to a particular pedestrian or group of pedestrians nearby.

However, the autonomous vehicle can include any other number or type of exterior speakers or audio drivers arranged in any other way in or on the autonomous vehicle.

5. Pedestrian Tracking

Block S120 of the method S100 recites, over a first period of time, detecting a pedestrian proximal the road surface; Block S130 of the method S100 recites predicting an initial intent (or an initial path) of the pedestrian based on actions of the pedestrian during the first period of time; and Block S140 of the method S100 recites calculating an initial confidence score for the initial path of the pedestrian based on motion characteristics of the pedestrian during the first period of time in Block S140.

Figure 3:
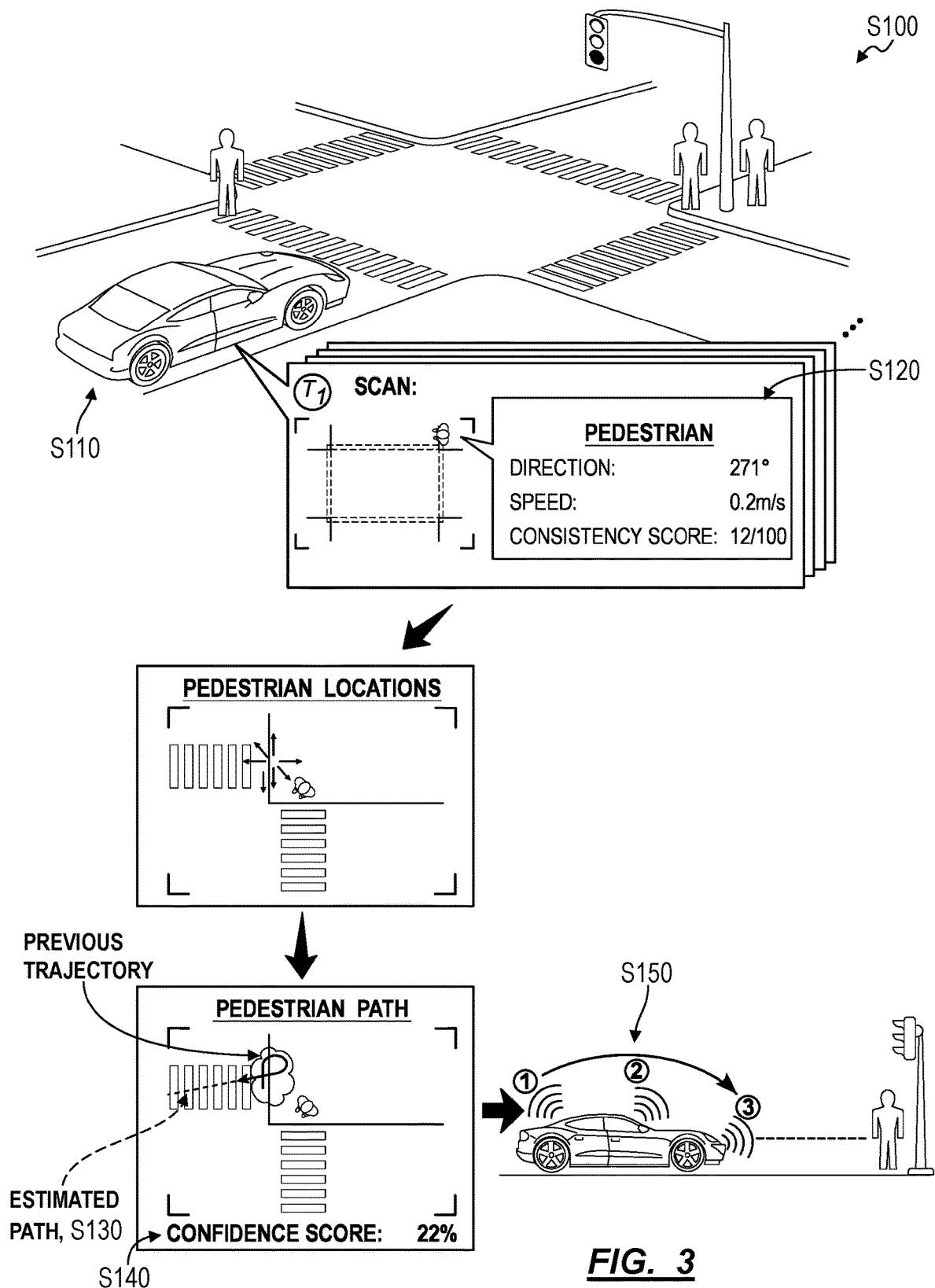
FIG. 3 is a flowchart representation of one variation of the method.

Generally, as the autonomous vehicle approaches an intersection (or other road surface) in Block S110 and/or once the autonomous vehicle stops ahead of this intersection, the autonomous vehicle can: scan the scene around the autonomous vehicle; identify pedestrians (and/or traffic signals, other vehicles, obstacles, etc.) near the autonomous vehicle's planned route from these scan data in Block S120; and then monitor these pedestrians—such as directions, speeds, and direction changes of these pedestrians—over time in Block S120, as shown in FIGS. 1, 2, and 3. The autonomous vehicle can then: extrapolate a path of each pedestrian (e.g., a path that the pedestrian may traverse in the near future) in Block S130 based on the speed and direction of motion of the autonomous vehicle over a preceding period of time; and quantify a confidence in the temporal and/or locational accuracy of the extrapolated path of each pedestrian in Block S140, such as proportional to the speed of the pedestrian, the consistency of the speed of the pedestrian, and the consistency of the direction of the pedestrian moving near the intersection over this period of time.

5.1 Pedestrian Path

In one implementation shown in FIG. 3, the autonomous vehicle: scans a scene around the vehicle during a scan cycle; isolates scan data corresponding to a section of roadway—and nearby surfaces—ahead of the autonomous vehicle; implements object recognition, template matching, object detection, object tracking, and/or other computer vision techniques to identify a pedestrian in these scan data; and calculates a location of the pedestrian during this scan period, such as in geospatial coordinates, relative to a static local object, or relative to the autonomous vehicle. By regularly scanning the scene, detecting the pedestrian in the scene, and extracting the location of the pedestrian in the scene over a period of time, such as ten times per second over a period of five seconds, the autonomous vehicle can amass a sequence of locations of the pedestrian in Block S120. The autonomous vehicle can then implement regression or other object tracking techniques to calculate an upcoming path of the pedestrian in Block S130. For example, the autonomous vehicle can: calculate a polynomial line that best fits locations of the pedestrian during the preceding period of time; anchor the polynomial line at the pedestrian's current location; and project the polynomial line forward to predict the upcoming path of the pedestrian in Block S130.

The autonomous vehicle can also calculate a confidence score for the estimated path of the pedestrian in Block S140 based on an error between these pedestrian locations and the polynomial line of best fit. The autonomous vehicle can also adjust the confidence score as a function of the speed of the pedestrian. For example, a pedestrian walking along a relatively direct, unwavering path may move at a walk at a relatively high speed, whereas a pedestrian (e.g., a tourist) walking at a slower speed may exhibit less confidence in her path and may therefore be more likely to deviate from her current path, such as by turning around, stopping abruptly, or erratically navigating around nearby obstacles; the autonomous vehicle can therefore adjust the confidence score for the estimated path of the pedestrian based on the pedestrian's speed. Similarly, a path estimated by the autonomous vehicle for a pedestrian moving erratically (e.g., frequently changing direction by more than 60°) may inherently exhibit relatively large error, that is, deviation between the actual and predicted locations of the pedestrian over time; the autonomous vehicle can therefore adjust the confidence score proportional to the consistency of the pedestrian's motion (e.g., as an inverse function of the frequency with which the pedestrian changes direction by more than 60°).

Furthermore, as the autonomous vehicle continues to scan the nearby scene and extract locations of the pedestrian from these scan data, the autonomous vehicle can calculate a confidence score for a path extrapolated from this polynomial line as a function of how well this polynomial line fits subsequent locations actually occupied by the pedestrian. However, the autonomous vehicle can calculate (and recalculate) the path and corresponding confidence score for the pedestrian in any other way and according to any other type of scan data collected from the scene around the autonomous vehicle.

Therefore, the autonomous vehicle can: track motion characteristics of the pedestrian over a period of time; extrapolate a direction and a speed of the pedestrian from motion characteristics of the pedestrian during this period of time; and compile the current location of the pedestrian, the direction, and the speed into an initial path (or intent) of the pedestrian in Block S130. The autonomous vehicle can then calculate an initial confidence score for the initial path of the pedestrian based on consistency of the direction and consistency of the speed of the pedestrian during this period of time, such as inversely proportional to a frequency of directional changes by the pedestrian and proportional to the speed of the pedestrian during this period of time.

5.2 Pedestrian Intent

The autonomous vehicle can implement similar methods and techniques to determine the pedestrian's intent in Block S130. In one example shown in FIG. 1, the autonomous vehicle can implement object tracking techniques to track a pedestrian identified in one scan data over a subsequent sequence of scan data, calculate a velocity (i.e., a speed and direction) of the pedestrian based on changes in the pedestrian's location over the sequence of scans, and then predict the pedestrian's intent based on her velocity. In this example, the autonomous vehicle can calculate a high confidence in a predicted intent of the pedestrian to cross the street ahead of the autonomous vehicle if: the pedestrian is currently occupying or about to enter the crosswalk ahead of the autonomous vehicle; and the pedestrian's velocity indicates a trajectory along the crosswalk toward the opposing sidewalk. Similarly, in this example, the autonomous vehicle can interpret a low velocity (e.g., less than 0.5 meter per second) of the pedestrian, rapid directional changes (e.g., erratic motion) of the pedestrian, or otherwise limited global motion of the pedestrian while occupying a crosswalk, a sidewalk ramp, or an edge of a sidewalk near the roadway ahead of the autonomous vehicle as a low confidence in a predicted intent of the pedestrian to cross the roadway ahead of the autonomous vehicle.

Therefore, the autonomous vehicle can predict a pedestrian's intent to cross a street ahead of the autonomous vehicle or to remain on the sidewalk nearby based on the pedestrian's global trajectory, speed, and displacement over a period of time (i.e., over a sequence of scans of the scene around the autonomous vehicle). As described below, if the confidence score for this predicted intent of the pedestrian falls below a threshold confidence, the autonomous vehicle can execute Block S150 to prompt the pedestrian to change her motion, which the autonomous vehicle can track in Block S122 to predict the pedestrian's intent with greater confidence in Blocks S132 and S142.

5.3 Collision Detection

The autonomous vehicle can also compare its current trajectory (e.g., if the autonomous vehicle is in motion) and/or its planned route to the estimated path of the pedestrian to estimate distances between the pedestrian and the autonomous vehicle during a succeeding period of time. For example, the autonomous vehicle can calculate a two-dimensional temporal area or three-dimensional temporal volume representing possible future locations of the pedestrian based on the pedestrian's current location, path, and confidence score and then compare this area or volume to the autonomous vehicle's current trajectory and planned route to determine whether the pedestrian falls or is likely to fall within the path of the autonomous vehicle; if so, the autonomous vehicle can flag the pedestrian for active manipulation in Block S150.

The autonomous vehicle can implement the foregoing process for each pedestrian detected in the scene around the autonomous vehicle and can selectively flag pedestrians for active manipulation in Block S150 if certain path and confidence score conditions are met, as described below.

6. Gaze

In one variation shown in FIG. 2, Block S120 further includes estimating a gaze of the pedestrian. In this variation, the autonomous vehicle can: implement eye tracking, face tracking, object recognition, and/or other computer vision techniques to detect the face of the pedestrian; estimate a field of view of the pedestrian based on a direction and orientation of the pedestrian's face; and then determine whether the location of the autonomous vehicle intersects the pedestrian's field of view. The autonomous vehicle can then adjust a confidence score for current and future paths of the pedestrian based on whether the pedestrian has recently observed the autonomous vehicle (e.g., whether the autonomous vehicle has determined that the location of the autonomous vehicle has intersected the pedestrian's gaze since the autonomous vehicle came within a threshold distance of the pedestrian). For example, the autonomous vehicle can reduce a confidence score for the path of a pedestrian if the pedestrian's gaze has not yet intersected the location of the autonomous vehicle; and vice versa.

Therefore, by reducing the confidence score for an estimated path of a pedestrian if the pedestrian has not (or is likely to have not) yet observed the autonomous vehicle, the autonomous vehicle can compensate for a likelihood that a pedestrian will change her path once she notices the autonomous vehicle nearby; and vice versa.

7. Right of Way

In one variation shown in FIGS. 1 and 2, the autonomous vehicle can also determine whether the autonomous vehicle or another entity nearby has right of way to cross the road surface ahead of the autonomous vehicle. For example, the autonomous vehicle can: scan a scene around the autonomous vehicle; detect possession of a right of way to cross the road surface by other than the autonomous vehicle based on features detected in the scene during the first period of time;

and detect transition of right of way to cross the road surface to the autonomous vehicle based on changes to features detected in the scene.

In this variation, the autonomous vehicle can implement methods and techniques similar to those described above to detect a traffic signal or traffic sign in the scan data and determine whether the autonomous vehicle, another vehicle nearby, or a pedestrian, etc. possesses right of way to enter an intersection ahead of the autonomous vehicle based on a state of the traffic signal or traffic sign. The autonomous vehicle can regularly repeat this process, such as at a rate of 20 Hz, to reassess right of way near the autonomous vehicle.

8. Thresholds

Upon determining that the autonomous vehicle (now or still) possesses right of way to cross a road surface ahead, the autonomous vehicle can selectively resume its planned route in Bock S160 directly or execute Block S150 to manipulate a pedestrian based on an estimated path of the pedestrian and a confidence score for this pedestrian's path. In particular, if the path of the pedestrian does not intersect the planned route of the autonomous vehicle and the confidence score for the pedestrian's path exceeds a threshold confidence, the autonomous vehicle can resume its planned path in Block S160 without broadcasting an audio signal to manipulate the pedestrian in Block S150. Similarly, if the path of the pedestrian does intersect the planned route of the autonomous vehicle and the confidence score for the pedestrian's path exceeds the threshold confidence, the autonomous vehicle can wait for some period of time for the pedestrian to pass before resuming the planned path in Block S160 and without broadcasting an audio signal to manipulate the pedestrian in Block S150. However, if the confidence score for the path of the pedestrian is less than the threshold confidence and the pedestrian is within a threshold distance of the autonomous vehicle's planned route, the autonomous vehicle can execute Block S150 to broadcast an audio track audible to the pedestrian, track the pedestrian's response to this audio track, and then selectively execute Block S160 based on the pedestrian's response.

In one variation, the autonomous vehicle dynamically adjusts the threshold confidence. For example, once the autonomous vehicle determines that it has right of way to cross a road surface, t and prior to autonomously navigating through an intersection according to the planned route, the autonomous vehicle can set the threshold confidence as a function of (e.g., inversely proportional to) a time since right of way to enter the intersection transitioned to the autonomous vehicle. Therefore, in this example, the autonomous vehicle can reduce sensitivity to a confidence score of a pedestrian's estimated path as the contiguous duration of time that the autonomous vehicle has possessed right of way at this intersection increases, thereby reducing likelihood that the autonomous vehicle will "get stuck" at this intersection due to presence of a pedestrian with indiscernible intent.

Similarly, the autonomous vehicle can set a threshold distance between the pedestrian and the planned route at which the autonomous vehicle will flag the pedestrian and delay resumption of the planned route. For example, the autonomous vehicle can set the threshold distance for a particular pedestrian inversely proportional to the confidence score for the path of this pedestrian, proportional to a speed of the autonomous vehicle, and/or proportional to a density of vehicle traffic nearby. In another example, the autonomous vehicle can select from a list of preset threshold distances based on features of the intersection (e.g., two-way, four-way, protected left turn, etc.). The autonomous vehicle can also set a threshold distance between the estimated path of the pedestrian and the planned route at which the autonomous vehicle will flag the pedestrian and delay resumption of the planned route based on similar parameters.

However, the autonomous vehicle can adjust threshold values for triggering execution of Block S150 rather than Block S160 directly according to any other parameter or features extracted from the scene around the autonomous vehicle.

9. Scene Manipulation Through Audio

As shown in FIGS. 1 and 3, Block S150 of the method S100 recites, in response to the initial confidence score for the initial path of the pedestrian falling below a threshold confidence, replaying an audio track audible to the pedestrian. Generally, in Block S150, the autonomous vehicle can broadcast an audio signal in order to prompt a pedestrian to modify her motion—which may better communicate to the autonomous vehicle the pedestrian's intent—if various conditions are met, such as: if the confidence score for the pedestrian's path is less than the threshold confidence and the pedestrian is currently within a threshold distance of the autonomous vehicle's planned route; or if the confidence score for the pedestrian's path is less than the threshold confidence and the estimated path of the pedestrian falls within a threshold distance of the autonomous vehicle's planned route. In particular, in Block S150, the autonomous vehicle can replay an audio track that, when heard by the pedestrian, may prompt the pedestrian to look toward the autonomous vehicle, move faster through the crosswalk, back away from the edge of the sidewalk, or pause her current action, etc. in Block S150. The autonomous vehicle can then: track the pedestrian's motion following replay of the audio track in Block S122; recalculate a path of the pedestrian in Block S132; and update a confidence score for the pedestrian's path in Block S142.

In one implementation, the autonomous vehicle replays an audio track through external speakers integrated into or mounted onto the autonomous vehicle in order to indicate its intent to advance forward through the intersection and to audibly prompt the pedestrian to change her motion—that is, to provide physical "feedback" suggestive of her intent to navigate a sidewalk or street near the autonomous vehicle without requiring the pedestrian to necessarily view the autonomous vehicle directly. The autonomous vehicle can then extract an intent of the pedestrian with greater accuracy based on motions of the pedestrian following replay of the audio track. In particular, by broadcasting the audio signal in Block S150, the autonomous vehicle can: audibly inform a pedestrian of proximity of the autonomous vehicle to the pedestrian; prompt a pedestrian standing (approximately) still near the autonomous vehicle's planned route to move; to enable the autonomous vehicle to better predict a pedestrian's intended direction based on the pedestrian's movement following replay of the audio track; and/or prompt a pedestrian who is currently moving with low consistency—such as frequent and substantive changes in direction or speed that may suggest that the pedestrian is unsure of her path or has not decided on a path—to decide on a path and then execute this path. The autonomous vehicle can then determine the pedestrian's intent with greater confidence and elect a next action accordingly.

9.1 Audio Types

In Block S150, the autonomous vehicle can replay an audio track suggestive of aggression without executing a physically aggressive motion or action at an intersection or roadway. For example, the autonomous vehicle can replay an audio track including sounds of: a revving engine; screeching tires; a crash or impact; shattering glass; or a siren. In this implementation, the autonomous vehicle can also replay a dynamic audio track, such as by scanning the audio track dynamically across two or more speakers, in order to suggest motion at the autonomous vehicle. For example, the autonomous vehicle can scan an audio track including sounds of a revving engine and screeching tires from a rear-most speaker to a front-most speaker on the autonomous vehicle and then fade out this audio track at the front-most speaker in order to audibly suggest to pedestrians nearby that a vehicle is rapidly accelerating forward from the current position of the autonomous vehicle. In this example, such replay of this audio track may command the attention of pedestrians near the intersection, such as causing pedestrians to pause to look in the direction of the autonomous vehicle before resuming their previous motions, such as at a more rapid rate.

In one example, while the autonomous vehicle is stopped ahead of a road surface (e.g., an intersection, a parking space), the autonomous vehicle can audibly replicate a motor vehicle accelerating near the road surface by: replaying an audio track including engine exhaust noise through a rear-facing external speaker on the autonomous vehicle; transitioning to replay of the audio track through a forward-facing external speaker on the autonomous vehicle; and terminating replay of the audio track by decrescendo. By dynamically broadcasting the audio track from audio drivers arranged in different locations on the autonomous vehicle, the autonomous vehicle may audibly suggest to the pedestrian that a danger may be present nearby, which may prompt the pedestrian to redirect her attention to the road surface and to the autonomous vehicle. The pedestrian's response to hearing this audio track may then be suggestive of the pedestrian's intent and awareness of the road surface near the autonomous vehicle. In a similar example, the autonomous vehicle can broadcast an audible alarm in Block S150.

Alternatively, the autonomous vehicle can replay an audio track including sounds of: a computer "powering-on" or entering a "standby" mode; a human voice requesting that the pedestrian step out of the crosswalk; or electrical static; etc. Furthermore, in Block S150, the autonomous vehicle can replay a prerecorded sound based on the autonomous vehicle "personality" selected by an owner, occupant, or manager of the autonomous vehicle, such as a custom or fleet-specific audio track.

9.2 Targeted Audio

In one implementation, the autonomous vehicle targets a particular pedestrian—in a scene near the autonomous vehicle—to receive an audio track replayed through speakers on the autonomous vehicle in order to prompt a physical response from this particular pedestrian in Block S150 and thus modify (i.e., "manipulate") the scene around the autonomous vehicle. For example, the autonomous vehicle can: identify the position of the pedestrian relative to the autonomous vehicle in a recent scan data; define an audio vector passing from the dorsoventral axis of the autonomous vehicle through a vertical center of the pedestrian; and replay an audio track dynamically—through speakers integrated into the autonomous vehicle—from the rear of the autonomous vehicle to the front of the autonomous vehicle and laterally balanced along the audio vector. In the example described above in which the autonomous vehicle replays an audio track including sounds of a revving engine and screeching tires (or other sound clips intended to distract or elicit an emotion from a pedestrian nearby) in Block S122, the pedestrian may thus perceive this directional audio track as a vehicle rapidly accelerating in her direction, thereby prompting the pedestrian to either instinctively step back from the street or move more rapidly through the crosswalk.

The autonomous vehicle can then track this pedestrian following replay of the directional audio track in Block S122, recalculate an intent (or path) and a corresponding confidence for the pedestrian over time, and execute one of various navigational paths to move past the pedestrian in Block S160, as described below.

9.3 Gaze

In one variation, the autonomous vehicle can also selectively execute Block S150 based on whether the autonomous vehicle has determined that the pedestrian has visually observed the autonomous vehicle. For example, the autonomous vehicle can implement methods and techniques described above to estimate the gaze of the pedestrian in Block S120. If the autonomous vehicle determines that the pedestrian's gaze has not yet met the autonomous vehicle and the pedestrian is within a threshold distance of the autonomous vehicle's planned route, the pedestrian's estimated path is within a threshold distance of the autonomous vehicle's planned route, and/or the confidence score for the pedestrian's path is less than the threshold confidence, the autonomous vehicle can: broadcast an audio track (e.g., an audible alarm signal); track the pedestrian following replay of the audio track in Block S122, as described below; and then cease broadcast of the audio track once the autonomous vehicle determines that the gaze of the pedestrian has intersected the autonomous vehicle.

9.4 Delay Timer

In one implementation, the autonomous vehicle implements a delay timer to delay or withhold replay of the audio track following determination that the autonomous vehicle has right of way in order to accommodate a pedestrian that may be unaware of the state of a nearby intersection or the presence of the autonomous vehicle before actively alerting the pedestrian of the autonomous vehicle's intent to cross the intersection.

For example, when stopped at a signal-controlled intersection, the autonomous vehicle can regularly process scan data to identify a traffic signal at the intersection and to determine whether the autonomous vehicle has right of way to enter the intersection based on an illuminated signal color at the traffic signal. In this example, while stopped at the intersection, the autonomous vehicle can also process scan data to identify and track pedestrians (and other obstacles) that may affect the autonomous vehicle's entry into the intersection. In particular, as the autonomous vehicle waits at the intersection, the autonomous vehicle can: detect a sidewalk proximal the road surface; detect a pedestrian adjacent an edge of the sidewalk in Block Silo; and calculate an intent (or path) and a corresponding confidence score for the pedestrian based on the pedestrian's position and motion at the edge of the sidewalk. The autonomous vehicle can regularly recalculate the pedestrian's intent and corresponding confidence score as the autonomous vehicle collects additional motion and position data from the pedestrian, as described above, while waiting for right of way to enter the intersection.

In the foregoing example, once the autonomous vehicle detects that the light has changed and that the autonomous vehicle now has right of way to enter the intersection, the autonomous vehicle can immediately resume its planned route if the estimated path of the pedestrian does not intersect the autonomous vehicle's route and if the confidence score for the pedestrian's path exceeds a threshold confidence. For example, the autonomous vehicle can resume its planned route at a fraction of full speed (or peak acceleration) proportional to the confidence score in excess of the threshold confidence. However, if the estimated path of the pedestrian does intersect the autonomous vehicle's route and/or if the corresponding confidence score for the path is less than (i.e., is exceeded by) the threshold confidence, the autonomous vehicle can wait for a delay time (e.g., three seconds)—after confirming its possession of right of way—for the pedestrian to begin moving across the crosswalk or to step back from the crosswalk. If the pedestrian fails to move away from the edge of the sidewalk or to move across the crosswalk within this delay time, the autonomous vehicle can replay the audio track—such as directed (or "projected") toward this particular pedestrian—in order to prompt the pedestrian to move away from the edge of the sidewalk.

In the foregoing example, the autonomous vehicle can set a duration of the delay timer as a function of (e.g., inversely proportional to) an amount of vehicle and/or pedestrian traffic present near the intersection. Alternatively, the autonomous vehicle can select the duration of the delay timer based on a type of the intersection or road surface. For example, the autonomous vehicle can access preset delay timer durations of: three seconds for busy controlled intersections; five seconds for low-traffic controlled intersections; two seconds for uncontrolled intersections; etc. and selectively implement these delay timer durations based on features detected near the autonomous vehicle or based on delay timer duration annotation within the navigation map described above.

In a similar example, the autonomous vehicle can: predict an initial path of the pedestrian and initial confidence score based on actions of the pedestrian over a first period of time and prior to the autonomous vehicle possessing right of way to cross the road surface; detect transition of right of way to cross the road surface to the autonomous vehicle at a second time succeeding the first period of time based on features detected in the scene; and then replay the audio track at a third time succeeding the second time by a delay time if the initial confidence score for the pedestrian's path falls below the threshold confidence, if a location of the pedestrian at the third time falls within a threshold distance of the planned route of the autonomous vehicle, and if right of way has transitioned to the autonomous vehicle. Therefore, in this example, if a light ahead of the autonomous vehicle changes and the autonomous vehicle now has right of way to enter the intersection but a pedestrian is currently in or sufficiently near the autonomous vehicle's planned route and has not been associated with a sufficiently high confidence score, the autonomous vehicle can pause for the pedestrian for the delay time before executing Block S150. In this example, the autonomous vehicle can also adjust the delay duration, as described above, such as proportional to the confidence score for the pedestrian's path (e.g., to give a pedestrian with clearer body language more time to exit the intersection).

The autonomous vehicle can implement similar methods and techniques when encountering pedestrians in other scenarios. For example, the autonomous vehicle can implement: a delay time of two seconds when waiting for a pedestrian to move out of the way of a parking space as the autonomous vehicle navigates into the parking space; and a delay time of four seconds when waiting for a pedestrian to move away from a region of a parking lot behind the autonomous vehicle as the autonomous vehicle attempts to back out of its current parking space.

10. Post-Audio Prompt Pedestrian Tracking

As shown in FIGS. 1 and 2, the method S100 further includes: Block S122, which recites tracking the pedestrian following replay of the audio track; Block S132, which recites calculating a revised path of the pedestrian based on actions of the pedestrian following replay of the audio track; and in Block S142, which recites calculating a revised confidence score for the revised path of the pedestrian based on motion characteristics of the pedestrian following replay of the audio track. Generally, following replay of the audio track in Block S150, the autonomous vehicle can implement methods and techniques described above to: identify the pedestrian in subsequent scan data in Block S122; revise the predicted path of the pedestrian in Block S132; and revise a confidence score for the pedestrian's path in Block S142 based on a difference between the pedestrian's motion before and after replaying the audio track. In particular, upon hearing the audio signal broadcast by the autonomous vehicle in Block S150, the pedestrian may instinctively look in the direction of the autonomous vehicle, step back from an adjacent sidewalk, hurry through a crosswalk, or step away from the autonomous vehicle to avoid a perceived danger suggested by the audio signal; the autonomous vehicle can thus extract an intent of the pedestrian—such as whether the pedestrian intends to cross the street ahead of the alignment feature—with a greater degree of confidence from the pedestrian's post-audio prompt motion. By manipulating the pedestrian in this way in Block S150, the autonomous vehicle may reach a decision to cross the road surface (e.g., enter the intersection, back out of a parking space, etc.) more rapidly despite presence of pedestrians and reduce likelihood of becoming "stuck" due to presence of pedestrians nearby.

In Blocks S122, S132, and S142, the autonomous vehicle can implement methods and techniques described above to transform pedestrian location and motion data extracted from a sequence of optical scans into a revised path and corresponding revised confidence score for the pedestrian. For example, the autonomous vehicle can calculate a revised confidence score—that now exceeds both the initial pre-audio prompt confidence score and the preset threshold confidence—responsive to increased consistency of motion characteristics of the pedestrian following replay of the audio track. Therefore, in this example, the pedestrian may have transitioned to faster and more direct motion through a crosswalk ahead of the autonomous vehicle upon hearing the audio signal broadcast by the autonomous vehicle in Block S150; the autonomous vehicle can then transform this motion of the pedestrian into a path that spans the crosswalk and a greater confidence score that the pedestrian intends to cross this crosswalk and exit onto a nearby sidewalk.

As described above, the autonomous vehicle can also estimate a gaze of the pedestrian following replay of the audio track; and then calculate a revised confidence score—that now exceeds the threshold confidence—in response to the gaze of the pedestrian intersecting the autonomous vehicle following replay of the audio track.

However, the autonomous vehicle can implement any other method or technique to recalculate the path of the pedestrian and the corresponding confidence score based on actions, locations, and/or motion characteristics of the pedestrian following replay of the audio track.

The autonomous vehicle can then repeat the foregoing processes to direct further audio signals toward the pedestrian if the revised confidence score remains below the threshold confidence, recalculate the pedestrian's path, and recalculate a corresponding confidence score, etc. until the intent of the pedestrian is known by the autonomous vehicle with sufficient confidence.

11. Post-Audio Actions

Block S160 of the method S100 recites, in response to the revised path of the pedestrian falling outside of a planned route of the autonomous vehicle across the road surface (e.g., by a threshold distance) and in response to the revised confidence score exceeding the threshold confidence, autonomously navigating across the road surface according to the planned route in Block S160. Generally, in Block S160, the autonomous vehicle can resume its planned route (or modify and then resume its planned route) once various local conditions are met, such as: the pedestrian is not currently occupying a location that falls within a threshold distance of the planned route; an estimated path of the pedestrian does not fall within the threshold distance of the planned route; and/or the confidence score for the pedestrian's path exceeds a threshold confidence.

11.1 Pedestrian Near Crosswalk

In the example described above in which the autonomous vehicle detects a pedestrian occupying a sidewalk immediately adjacent a crosswalk or standing in a crosswalk immediately adjacent a sidewalk, as shown in FIGS. 1 and 3, the autonomous vehicle can calculate a low confidence score for a path of the pedestrian because the pedestrian's location suggests an immediate intent to cross the crosswalk while the pedestrian's limited motion suggests an intent to remain in her current location. The autonomous vehicle can thus replay an audio track in Block S150 to prompt the pedestrian to step away from the edge of the sidewalk. Following replay of the audio track, if the autonomous vehicle determines that the pedestrian has backed away from the edge of the sidewalk, the autonomous vehicle can recalculate the path of the pedestrian to reflect this movement away from the autonomous vehicle's route and can recalculate a corresponding confidence score, which may now exceed the threshold confidence. The autonomous vehicle can then resume its planned route accordingly.

Alternatively, following replay of the audio track, the autonomous vehicle can: detect the pedestrian stepping off of the edge of the sidewalk and into the crosswalk (and diligently away from the autonomous vehicle and toward an opposite sidewalk); calculate a revised path—that spans the crosswalk—for the pedestrian responsive to the pedestrian stepping into the crosswalk; and calculate a revised—and increased—confidence score for the pedestrian's path accordingly. Given the resulting revised path and increased confidence score for the pedestrian, the autonomous vehicle can withhold further replay of audio tracks directed toward the pedestrian and delay autonomous execution of the planned route until the pedestrian is detected outside of a threshold distance of the planned route. In particular, because the autonomous vehicle has determined that it currently has right of way at the intersection and estimated the pedestrian's path with a relatively high degree of confidence, the autonomous vehicle can resume the planned route once the pedestrian is sufficiently clear of the planned route and even if the pedestrian is still occupying a region of the crosswalk adjacent the planned route.

Yet alternatively, if the autonomous vehicle determines that the pedestrian is occupying approximately the same location at the edge of the sidewalk (or within the adjacent crosswalk) as before the autonomous vehicle replayed the audio track and that the pedestrian's current location does not coincide with the autonomous vehicle's planned route through the intersection, the autonomous vehicle can: recalculate the estimated path of the pedestrian to reflect an increased confidence score that the pedestrian will remain in her current location; and then resume forward motion through the intersection, such as at a relatively low speed and/or relatively low rate of acceleration (e.g., 40% of the indicated speed or 20% of the acceleration rate associated with the current intersection in the navigation map described above) in Block S160.

Similarly, if the autonomous vehicle determines that the pedestrian is occupying approximately the same location at the edge of a sidewalk or within the crosswalk as before the autonomous vehicle replayed the audio track and that the pedestrian's location coincides with the autonomous vehicle's planned route, the autonomous vehicle can: revise the planned route to navigate around the pedestrian given the increased confidence that the pedestrian's intent is to remain stationary; and then autonomously navigate around the pedestrian (e.g., at low speed) according to this revised route while in Block S160. In particular, the autonomous vehicle can selectively revise its planned route to navigate through an intersection—which may necessitate additional computing power and time—when a pedestrian is detected in the planned route, the autonomous vehicle has attempted to provide the pedestrian to move out of the way of the autonomous vehicle, and the pedestrian has ignored the autonomous vehicle's prompts; and the autonomous vehicle can increase its confidence in the pedestrian's intent to remain stationary to calculate a relatively efficient revised route past the pedestrian, such as a revised route that avoids the pedestrian by a minimum threshold distance rather than a revised route that brings the autonomous vehicle deep into another traffic lane.

11.2 Speed Modulation

In another implementation shown in FIG. 2, the autonomous vehicle can selectively resume the planned route at a speed or acceleration based on the pedestrian's location, estimated path, and/or corresponding confidence score.

For example, the autonomous vehicle can execute Blocks S150, S122, S132, and S142 as described above. Then, in response to the revised path of the pedestrian intersecting the planned route of the autonomous vehicle across an adjacent road surface, the autonomous vehicle can delay autonomous navigation across the road surface (i.e., delay resuming the planned route) and set a delay timer, such as described above. During countdown of the delay timer, the autonomous vehicle can continue to: track the pedestrian proximal the intersection; calculate revised paths of the pedestrian based on actions of the pedestrian over time; and calculate revised confidence scores for the revised paths of the pedestrian based on motion characteristics of the pedestrian during this time. Subsequently, in response to a revised path of the pedestrian falling outside of a threshold distance from the planned route of the autonomous vehicle and in response to the corresponding revised confidence score exceeding the threshold confidence during countdown of the delay timer, the autonomous vehicle can cancel the delay timer and autonomously navigate across the road surface according to the planned route (i.e., resume the planned route at a 100% of a predefined target speed or target rate of acceleration through the intersection). The autonomous vehicle can therefore resume the planned route as soon as the estimated path of the pedestrian no longer falls within a threshold distance of the planned route and the corresponding confidence score exceeds a threshold confidence.

However, if the delay timer expires prior to calculation of a revised path of the pedestrian that falls outside of the planned route of the autonomous vehicle and/or prior to calculation of a revised confidence score that exceeds the threshold confidence, the autonomous vehicle can autonomously approach the road surface at a reduced speed (e.g., by resuming the planned route at 20% of a predefined speed or rate of acceleration through the intersection). In particular, the autonomous vehicle can approach the crosswalk at a reduced speed if the delay timer expires prior to the revised path of the pedestrian diverging from the planned route of the autonomous vehicle by more than the threshold distance and/or prior to calculation of a confidence score for the pedestrian's path that exceeds the threshold confidence. As described above, the autonomous vehicle can also adjust the planned route to avoid the pedestrian, such as by offsetting the planned route to avoid the pedestrian by a distance inversely proportional to the confidence score for the pedestrian's estimated path.

Furthermore, the autonomous vehicle can implement similar methods and techniques as the autonomous vehicle resumes the planned route and approaches the pedestrian. For example, when resuming a planned route through an intersection and past a crosswalk (nearly) occupied by a pedestrian (i.e., as the autonomous vehicle approaches this crosswalk), the autonomous vehicle can: continue to track the pedestrian proximal the crosswalk; calculate another revised path of the pedestrian based on actions of the pedestrian during this period of time; and calculate a corresponding revised confidence score for this revised path of the pedestrian based on motion characteristics of the pedestrian over this period of time. Upon determining that this revised path of the pedestrian falls outside of the threshold distance from the planned route of the autonomous vehicle and that this revised confidence score exceeds the threshold confidence, the autonomous vehicle can resume autonomously navigating the planned route past the crosswalk at the predefined target speed (which is greater than the reduced speed assumed by the autonomous vehicle when the pedestrian's intent yielded greater risk for collision with the autonomous vehicle).

11.3 Parking Lot

In one variation, the autonomous vehicle implements similar methods and techniques when navigating through parking lots, such as into and/or out of a parking space. For example, in preparation for autonomously navigating out of (i.e., exiting) a parking space, the autonomous vehicle can: scan a scene behind the autonomous vehicle; detect a pedestrian in the scene behind the autonomous vehicle in Block S120; extrapolate an initial path of the pedestrian and a corresponding confidence score based on a velocity of the pedestrian behind the autonomous vehicle over a first period of time in Blocks S130 and S140; project an audible signal behind the autonomous vehicle (e.g., toward the pedestrian) in response to the initial confidence score falling below the threshold confidence in Block S150; and extract a revised path and confidence score for the pedestrian based on the pedestrian's motion following replay of the audio track in Blocks S122, S132, and S142. The autonomous vehicle can then autonomously back out of the parking space according to the planned route if the revised path of the pedestrian falls outside of the planned route, the revised confidence score exceeds the threshold confidence, and/or the pedestrian is detected at a location outside of a threshold distance from the planned route of the autonomous vehicle out of the parking space. Alternatively, if any of these conditions are not met, the autonomous vehicle can wait for the pedestrian to move, back out of the space at a slower rate, and/or alter the planned route to avoid the pedestrian, etc., as described above.

12. Group of Pedestrians

In one variation, the autonomous vehicle can implement similar methods and techniques to influence a group of pedestrians. For example, the autonomous vehicle can implement methods and techniques described above to identify a group of pedestrians on or near the autonomous vehicle's planned route in one or a sequence of scan data in Block S120 and then serve a dynamic audio track in Block S150 in order to prompt this group of pedestrians to instinctively, physically indicate its intent to cross the street or to remain at the sidewalk nearby. In Block S122, the autonomous vehicle can then implement methods and techniques as described above to track multiple pedestrians from this group across a sequence of scan data. In the example, if the autonomous vehicle determines that all pedestrians in the group have moved away from the crosswalk and back onto the sidewalk, the autonomous vehicle can calculate a high confidence in the intent of the group to remain on the sidewalk, calculate a high confidence score for entering the intersection in Block S142, and resume forward motion in Block S160. However, if the autonomous vehicle determines that one or more pedestrians have resumed motion through the crosswalk, the autonomous vehicle can calculate a high confidence in the intent of these pedestrians to cross the street ahead, calculate a high confidence in the intent of other pedestrians in the group to remain on the sidewalk, and wait for the pedestrians to reach their corresponding sides of the street before resuming forward motion in Block S160. Furthermore, if the autonomous vehicle determines that all pedestrians in the group have remained in approximately the same location or if a centroid of the group of pedestrians is in approximately the same location as before the audio track was replayed, the autonomous vehicle can calculate a high confidence in the intent of other pedestrians in the group to remain in their current locations and then modify the planned route to pass the group at a greater separation distance before resuming forward motion through the intersection in Block S160.

In a similar example, the autonomous vehicle can detect a group of pedestrians proximal the road surface in Block S120. If a density of pedestrians in this group of pedestrians exceeds a threshold density, the autonomous vehicle can: track motion of each pedestrian in the group of pedestrians over a period of time in Block S120; compile motion of each pedestrian in the group into an initial path of the group of pedestrians in Block S130; and calculate an initial confidence score for the initial path of the group of pedestrians based on motions of pedestrians in the group in Block S140. The autonomous vehicle can therefore track the group of pedestrians rather than individual pedestrians if the density of this group exceeds a threshold. The autonomous vehicle can then replay the audio track—to be audible to the group of pedestrians—if the initial confidence score for the initial path of the group of pedestrians falls below the threshold confidence in Block S150. The autonomous vehicle can then respond to changes to the motion of the group of pedestrians in aggregate according to subsequent Blocks of the method S100 if the group continues to move in unison or transition to tracking and responding to pedestrians individually if the group begins to disperse following replay of the audio track.

However, the autonomous vehicle can track and handle groups of pedestrians in any other way.

13. Timing

As described above, the autonomous vehicle can execute Blocks of the method S100 in limited scenarios or in response to preset triggers. For example, the autonomous vehicle can execute the method S100 when the autonomous vehicle is immediately adjacent and facing an intersection but can disable various Blocks of the method S100 (e.g., Block S150) when following another road vehicle through an intersection, since the lead road vehicle may separately execute such methods and techniques to manipulate the scene (e.g., pedestrians) ahead. In another example, the autonomous vehicle can execute the method S100 exclusively when the autonomous vehicle has determined that: it has the right of way (e.g., as indicated by a traffic signal) at an intersection; and a decision to resume its planned route motion is impeded by a low confidence in the comprehension of the intent of a pedestrian near the intersection.

14. Visuals

In one variation, the autonomous vehicle can implement similar methods and techniques to selectively replay visual content—such as on a display mounted to the autonomous vehicle—to prompt a pedestrian nearby to modify her behavior, which may enable the autonomous vehicle to better interpret the pedestrian's intent. For example, when the autonomous vehicle detects a pedestrian nearby and determines that the pedestrian's presence is limiting the autonomous vehicle's ability to elect a next action (e.g., the confidence score for the pedestrian's path is less than a threshold confidence), the autonomous vehicle can replay a video clip engendering visual dissonance (e.g., flashing lights in various colors), a fight or flight prompt (e.g., a strobe light), or a distraction (e.g., a rapidly-moving light flash or beam of projected light). In this example, if the display is in the pedestrian's peripheral view, this video clip may catch the pedestrian's eye, thereby making the pedestrian aware of the autonomous vehicle, which may also prompt the pedestrian to modify her motion to better avoid the autonomous vehicle. The autonomous vehicle can also render the video clip on a display facing the pedestrian but furthest from the pedestrian in order to better ensure that the video clip is seen in the pedestrian's peripheral vision rather than direct vision in order to prompt a more significant reaction from the pedestrian.

In this variation, the autonomous vehicle can implement methods and techniques described above to trigger replay of such a video clip and can output both audio and visual prompts substantially simultaneously in order to prompt a pedestrian near the autonomous vehicle to change her behavior.

As with audio signals described above, the autonomous vehicle can therefore selectively output visual signals in order to inform a pedestrian of the autonomous vehicle's presence nearby and to prompt the pedestrian to instinctively communicate her intent through a change in her motion; by implementing Blocks of the method S100 to track the pedestrian before and after outputting such visual signals, the autonomous vehicle can achieve a greater comprehension of the pedestrian's intent and then navigate past the pedestrian accordingly with reduced risk of collision.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

What is claimed is:

1. A system comprising:
   at least one sensor of an autonomous vehicle, the at least one sensor configured to detect a person proximal to a travel path of the autonomous vehicle;
   at least one processor configured to estimate a gaze of the person and determine whether a field of view of the gaze of the person intersects a location of the autonomous vehicle; and
   one or more vehicle systems configured to execute at least one action of the autonomous vehicle autonomously, the at least one action autonomously generating based on a navigation decision corresponding to whether to navigate along the travel path, the navigation decision autonomously generated based on whether the field of view of the gaze of the person intersects the location of the autonomous vehicle.

2. The system of claim 1, wherein the at least one processor is further configured to autonomously determine a possession of a right of way of the autonomous vehicle for navigating along the travel path, the navigation decision further generated based on the possession of the right of way.

3. The system of claim 1, wherein a confidence score regarding whether the person observes the autonomous vehicle is generated based on the whether the field of view of the gaze of the person intersects the location of the autonomous vehicle.

4. The system of claim 3, wherein a comparison of the confidence score to a confidence threshold is generated, the navigation decision autonomously generated based on the comparison.

5. The system of claim 1, further comprising:
   at least one output device configured to direct a movement of the person based on the navigation decision, the movement of the person directed using a prompt for presentation to the person.

6. The system of claim 5, wherein the prompt is an audio prompt.

7. The system of claim 6, wherein the audio prompt is output using the at least one output device along an audio vector.

8. The system of claim 7, wherein the audio vector is determined based on a path of the person.

9. The system of claim 1, wherein the person is a pedestrian, a bicyclist, a motorcyclist, a driver of another vehicle, or riding on a scooter.

10. A method comprising:
    detecting a person proximal to a travel path of an autonomous vehicle;
    estimating a gaze of the person, the gaze having a field of view;

determining whether the field of view of the gaze of the person intersects a location of the autonomous vehicle;

autonomously generating at least one action of the autonomous vehicle based on a navigation decision corresponding to whether to navigate along the travel path, the navigation decision autonomously generated based on whether the field of view of the gaze of the person intersects the location of the autonomous vehicle; and executing the at least one action of the autonomous vehicle autonomously.

11. The method of claim 10, further comprising:

autonomously determining a possession of a right of way of the autonomous vehicle for navigating along the travel path, the navigation decision further generated based on the possession of the right of way.

12. The method of claim 10, further comprising:

generating a confidence score regarding whether the person observes the autonomous vehicle based on the whether the field of view of the gaze of the person intersects the location of the autonomous vehicle.

13. The method of claim 12, further comprising:

generating a comparison of the confidence score to a confidence threshold, the navigation decision autonomously generated based on the comparison.

14. The method of claim 10, further comprising:

directing a movement of the person based on the navigation decision, the movement of the person directed by generating a prompt for presentation to the person.

15. The method of claim 14, wherein the prompt is an audio prompt.

16. The method of claim 15, wherein the audio prompt is output along an audio vector.

17. The method of claim 16, wherein the audio vector is determined based on a path of the person.

18. The method of claim 10, wherein the person is a pedestrian, a bicyclist, a motorcyclist, a driver of another vehicle, or riding on a scooter.

19. One or more non-transitory computer-readable data storage media comprising instructions that, when executed by at least one computing unit of a computing system, cause the computing system to perform operations comprising:

detecting a person proximal to a travel path of an autonomous vehicle;

estimating a gaze of the person, the gaze having a field of view;

determining whether the field of view of the gaze of the person intersects a location of the autonomous vehicle;

generating at least one action of the autonomous vehicle based on a navigation decision corresponding to whether to navigate along the travel path, the navigation decision generated based on whether the field of view of the gaze of the person intersects the location of the autonomous vehicle; and causing the autonomous vehicle to execute the at least one action.

20. The one or more non-transitory computer-readable data storage media of claim 19, the operations further comprising:

directing a movement of the person based on the navigation decision, the movement of the person directed by generating a prompt for presentation to the person.

* * * * *